United States Patent [19]

Koyama

[11] Patent Number: 5,774,192
[45] Date of Patent: Jun. 30, 1998

[54] APPARATUS FOR RECORDING/REPRODUCING VIDEO DATA TO/FROM A SOLID-STATE

[75] Inventor: Shinichi Koyama, Tokyo, Japan

[73] Assignee: Canon Kabushiki Kaisha, Tokyo, Japan

[21] Appl. No.: 538,133

[22] Filed: Oct. 2, 1995

[30] Foreign Application Priority Data

Oct. 4, 1994 [JP] Japan .................................. 6-264496

[51] Int. Cl.⁶ .................................................. H04N 7/08
[52] U.S. Cl. ....................... 348/715; 348/720; 348/738; 348/513; 386/39; 386/96; 386/104; 360/19.1; 360/32; 360/36.1
[58] Field of Search .................................. 348/715–720, 348/738, 513, 526, 231, 232; 358/341, 343, 339, 320; 360/19.1, 36.2, 32, 33.1; 386/39, 96, 104, 105, 100, 106; H04N 7/08

[56] References Cited

U.S. PATENT DOCUMENTS

| | | | |
|---|---|---|---|
| 4,755,889 | 7/1988 | Schwartz | 360/32 |
| 4,996,607 | 2/1991 | Kashida et al. | 360/18 |
| 5,045,940 | 9/1991 | Peters et al. | 358/143 |
| 5,357,595 | 10/1994 | Sudoh et al. | 395/2.24 |
| 5,465,240 | 11/1995 | Mankovitz | 369/1 |
| 5,483,538 | 1/1996 | Rainbolt | 348/526 |

*Primary Examiner*—Glenton R. Burgess
*Attorney, Agent, or Firm*—Fitzpatrick, Cella, Harper & Scinto

[57] ABSTRACT

Input image data and audio data divided into a plurality of portions are continuously recorded in a solid-state memory. When the audio data is to be reproduced in units of the portions, a reproducing start address of each portion of the audio data is changed in an order different from that in recording, thereby reproducing the audio data. The image data is divided into a plurality of portions corresponding to the plurality of portions of the audio data. The image data is reproduced in units of the portions. At this time, the reproducing start address of each portion of the image data is changed in an order different from that in recording, thereby reproducing the image data. With this arrangement, even when the image and audio data are reproduced in an order different from that in recording, the reproduced audio data can be confirmed.

22 Claims, 4 Drawing Sheets

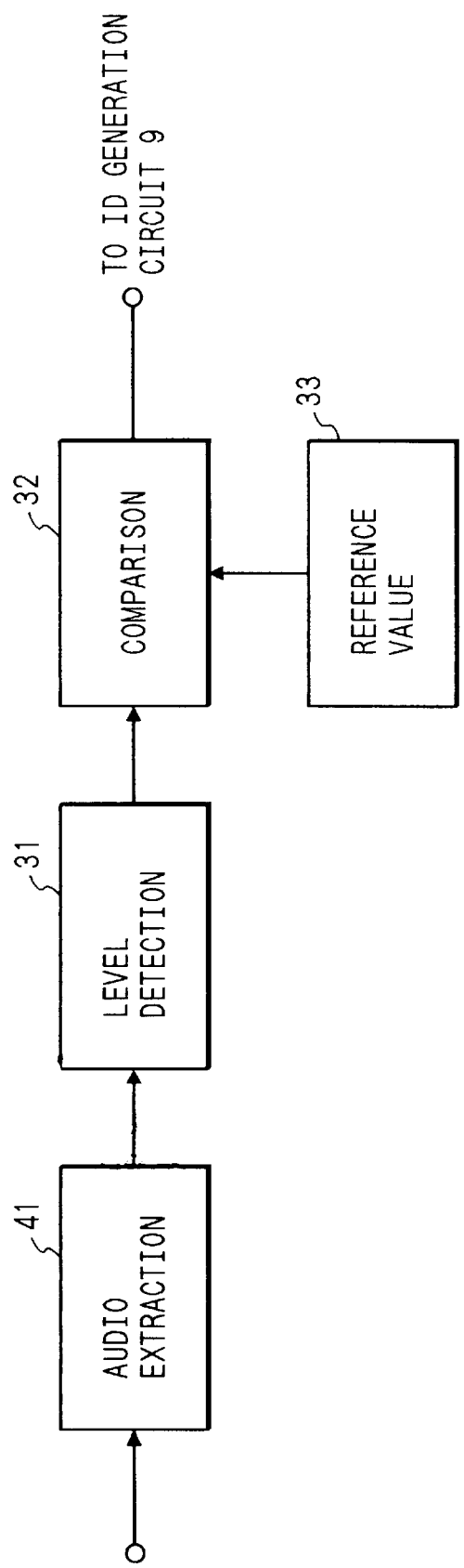

5,774,192

APPARATUS FOR RECORDING/REPRODUCING VIDEO DATA TO/FROM A SOLID-STATE

BACKGROUND OF THE INVENTION

1. Field of the Invention

The present invention relates to a data recording and reproducing apparatus and, more particularly, to an apparatus for recording or reproducing video data and audio data in or from a solid-state memory.

2. Related Background Art

Conventionally, when video and audio signals are to be recorded, a VTR (Video Tape Recorder); which records the signals as analog signals by using a magnetic tape having a width of ½ inch or 8 mm as a recording medium) is generally used.

A VTR of this type records/reproduces a video signal of one track/one field on a magnetic tape wound on a rotary drum and fed by a capstan by using a rotary head provided to the rotary drum.

When a special reproducing operation, and particularly, a reverse reproducing operation is to be performed in this VTR, the capstan is rotated in an opposite direction to feed the magnetic tape in a direction opposite to that in recording, thereby reproducing a signal while the rotary head crosses several tracks.

In reverse reproduction of the above VTR, however, when an audio signal is recorded while being superposed with a video signal, feeding of the magnetic tape in the opposite direction makes listening impossible because of a discontinuity. In addition, when an audio signal is recorded in a dedicated track in the transverse direction of the magnetic tape, a reverse signal is completely reproduced. Since the sound generation pitch is different from that in recording, the recorded audio signal cannot be confirmed.

SUMMARY OF THE INVENTION

It is an object of the present invention to solve the above problems.

It is another object of the present invention to allow confirmation of a recorded audio signal even during a special reproducing operation.

In consideration of these objects, according to an aspect of the present invention, there is provided a data recording and reproducing apparatus comprising:

(a) audio dividing means for dividing input audio data into a plurality of portions;

(b) recording means for continuously recording input image data and the audio data divided by the audio dividing means in a solid-state memory;

(c) audio reproducing means for reproducing the audio data from the solid-state memory in units of the portions, the audio reproducing means reproducing the audio data while changing a reproducing start address of each portion of the audio data in an order different from that in recording; and (d) image reproducing means for reproducing the image data from the solid-state memory, the image reproducing means dividing the image data recorded in the solid-state memory into a plurality of portions according to the plurality of portions of the audio data to reproduce the image data in units of the portions, and reproducing the image data while changing the reproducing start address of each portion of the image data in an order different from that in recording.

Other objects and features of the invention will be apparent in the following detailed description of an illustrative embodiment of the invention which is read with reference to the accompanying drawings.

BRIEF DESCRIPTION OF THE DRAWINGS

FIG. 4 is a view showing another arrangement of the silent portion detection unit.

DETAILED DESCRIPTION OF PREFERRED EMBODIMENT

An embodiment of the present invention will be described below with reference to the accompanying drawings.

Figure 1:
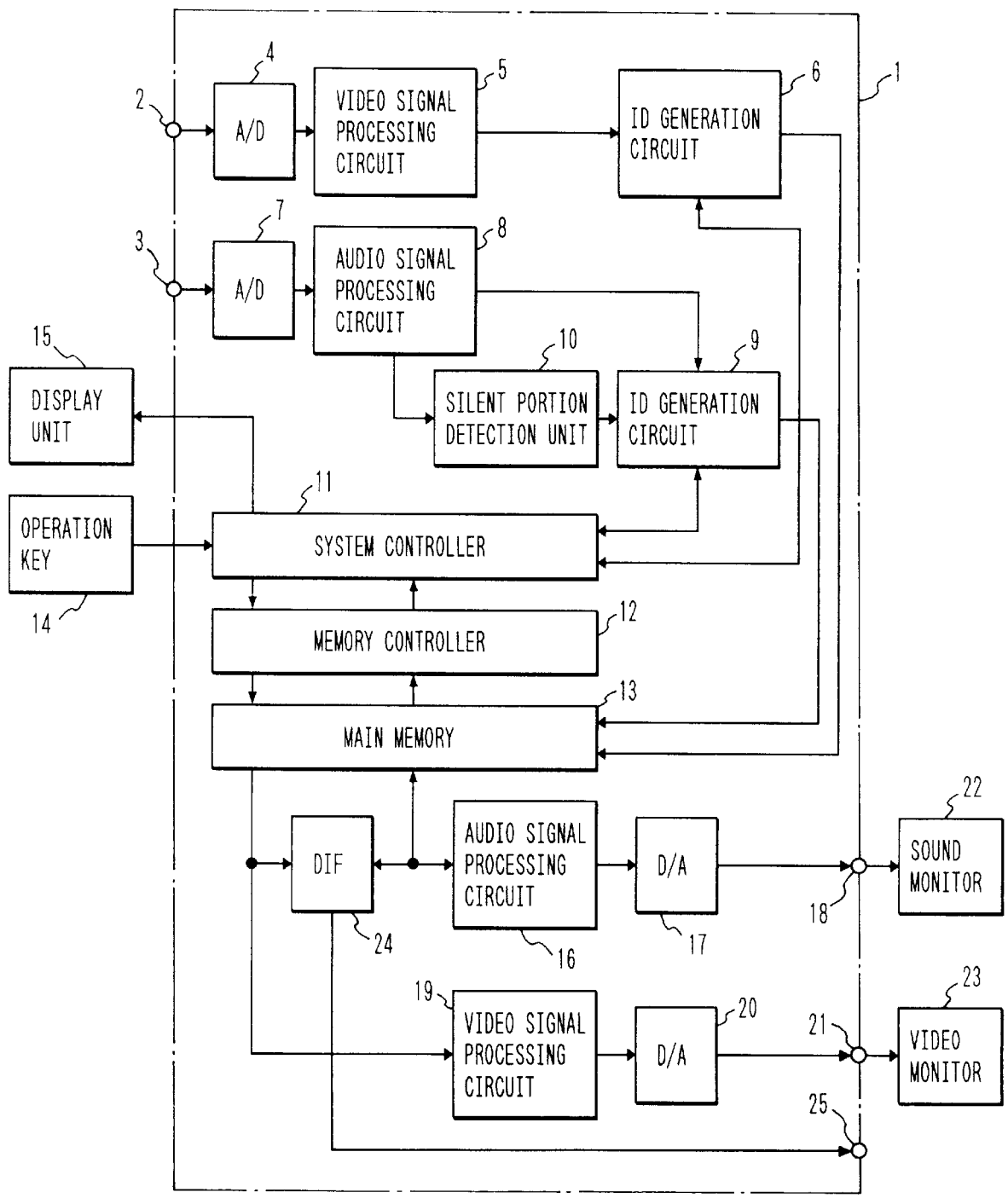
FIG. 1 is a block diagram schematically showing the arrangement of a memory video system according to an embodiment of the present invention.

FIG. 1 is a block diagram schematically showing the arrangement of a memory video system according to an embodiment of an information recording and reproducing apparatus of the present invention.

This memory video system 1 has a video input terminal 2 for inputting a video signal and an audio input terminal 3 for inputting an audio signal. An A/D converter 4, a video signal processing circuit 5, and an ID generation circuit 6 are sequentially connected to the video input terminal 2.

The A/D converter 4 can perform high-speed processing. The video signal processing circuit 5 performs Y/C separation, color processing, and the like of an input video signal. The ID generation circuit 6 has a function of adding a time code and an ID such as an image quality mode to a video signal.

An A/D converter 7, an audio signal processing circuit 8, and an ID generation circuit 9 are sequentially connected to the audio input terminal 3. A silent portion detection unit 10 is connected between the audio signal processing circuit 8 and the ID generation circuit 9. The audio signal processing circuit 8 performs processing including various types of noise removal and dynamic range limitation of an input audio signal. The silent portion detection unit 10 has a function of detecting the silent portion of an audio signal. The ID generation circuit 9 has a function of adding an ID representing the signal of a silent portion detected by the silent portion detection unit 10 and a time code to the ID of an audio signal.

The memory video system 1 has a system controller 11 for performing control as the overall system, such as switching of operations. A main memory 13 is connected to the system controller 11 through a memory controller 12.

The system controller 11 controls the memory controller 12 upon reception of an instruction for recording/reproduction/search from an operation key 14, and at the same time, displays information such as a time code representing an operation situation or recording/reproducing time on a display unit 15. This time code represents the elapsed time from the start of a recording medium or a video program, an accumulation time of photographing, date of recording or photographing, or time of a time frame. Write/read access of a memory address, video data, and audio data to the main memory 13 is controlled by the memory controller 12.

An audio signal processing circuit 16 and a D/A converter 17 are sequentially connected to the output of the main memory 13, and a video signal processing circuit 19 and a D/A converter 20 are also sequentially connected to the output of the main memory 13. The D/A converter 17 is connected to a sound monitor 22 through an output terminal 18, and the D/A converter 20 is connected to a video monitor 23 through an output terminal 21. A digital interface processing circuit (DIF) 24 for synthesizing readout video data and audio data is connected to the output of the main memory 13. The output of the digital interface processing circuit 24 is connected to an output terminal 25.

Operations (A), (B), and (C) of this embodiment will be described.

(A) Recording Operation

When a recording operation is designated from the operation key 14, a video signal input from the video input terminal 2 is converted into a digital video signal by the A/D converter 4. Y/C separation, color processing, data compression and encoding, and the like are performed by the video signal processing circuit 5, and the signal is sent to the ID generation circuit 6. The ID generation circuit 6 performs communication with the system controller 11 and adds a time code or an ID of an image quality mode to the video signal. The image quality mode includes a color processing mode, a quantization level in compression, and the like.

On the other hand, an audio signal input from the audio input terminal 3 is converted into a digital audio signal by the A/D converter 7. Processing including various types of noise removal, dynamic range limitation, encoding, and the like of the digital audio signal is performed by the audio signal processing circuit 8, and the signal is sent to the ID generation circuit 9 and the silent portion detection unit 10. The silent portion detection unit 10 detects a silent portion of the audio signal by a method to be described later, and the ID generation circuit 9 adds an ID representing the signal of a silent portion, and a time code to the ID of the audio signal.

The IDs added by the ID generation circuits 6 and 9 are digital signals, each of which is added for a predetermined amount of signal data, as in the video and audio signals. Normally, video data is represented in units of fields. Therefore, in this embodiment, an ID is added in units of fields. An audio signal is not represented by a unit. However, in consideration of synchronization with a video signal, an audio signal is also processed in units of fields. The video and audio data added with IDs are sequentially stored in the main memory 13 consisting of a solid-state memory such as a semiconductor memory.

Figure 2A:
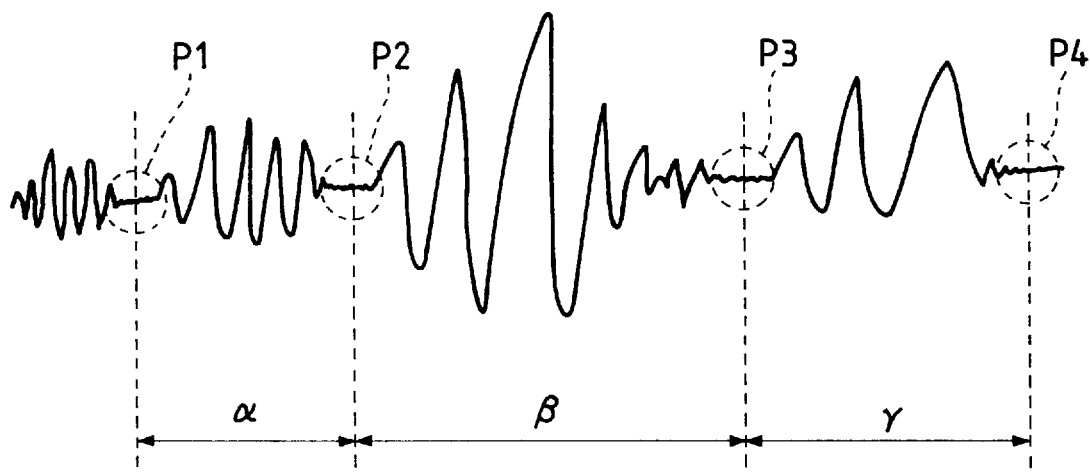
FIGS. 2A and 2B are views for explaining a silent portion detecting method of a silent portion detection unit in FIG. 1.

The silent portion detecting method of the silent portion detection unit 10 will be described below with reference to FIGS. 2A and 2B. FIG. 2A is a chart showing the analog waveform of an audio signal, and FIG. 2B is a block diagram showing the arrangement of the silent portion detection unit 10.

Portions P1 to P4 in FIG. 2A represent silent portions. A block from a silent portion to the next one ($\alpha$, $\beta$, or $\gamma$ in FIG. 2A) is defined as one unit. The circuit in FIG. 2B has a level detection circuit 31, a comparison circuit 32, and a reference value generation circuit 33.

Figure 2B:
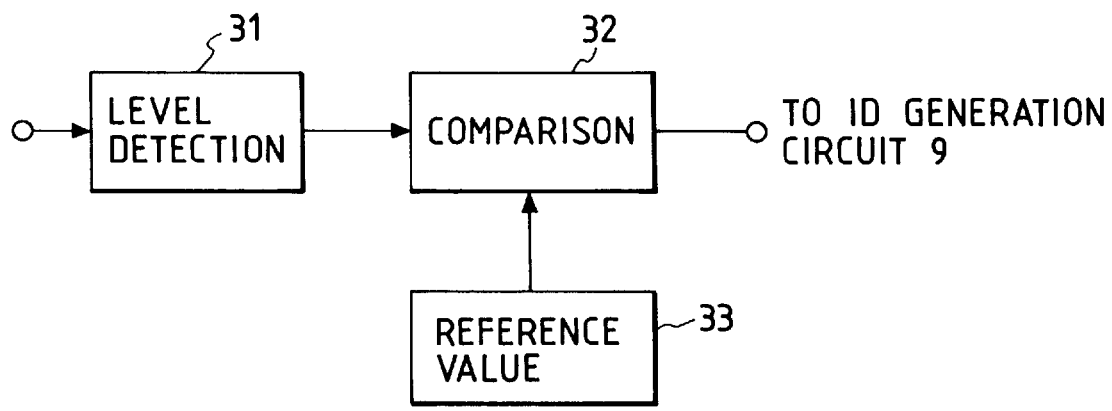

As for silent portion detection, a DC component is generated from an input analog audio signal shown in FIG. 2A by the level detection circuit 31 using an absolute value or a square circuit in the silent portion detection unit 10 shown in FIG. 2B. This DC component is compared with a reference value from the reference value generation circuit 33 by the comparison circuit 32. If the DC component is smaller than the reference value, information representing a silent portion is sent to the ID generation circuit 9. The ID generation circuit 9 adds an ID representing the silent portion to the silent portion data and stores the data in the main memory 13.

With such data processing, video and audio data are stored in the main memory 13. The main memory 13 can also be extended or have an exchangeable memory form such as an IC card.

When the stop of recording is designated by the operation key 14, the system controller stops recording in the main memory 13.

(B) Normal Reproducing Operation

A reproducing operation will be described with reference to FIG. 1.

When a reproducing operation is designated by the operation key 14, the system controller 11 issues an instruction to the memory controller 12, thereby reading out recorded video and audio data from the main memory 13 in an order of recording. The audio signal processing circuit 16 and the video signal processing circuit 19 perform signal processing necessary for outputs of data decoding, expansion processing, emphasis, chromatic encoding, and preparation of a composite signal, use the above ID signal to correct a shift due to a delay time necessary for reproduction signal processing, and synchronizes the data. The video and audio reproduction signals are converted into analog signals by the D/A converters 17 and 20 and output.

The user can confirm a reproduction output by the sound monitor 22 and the video monitor 23 respectively connected to the output terminal 18 and the output terminal 21. The video and audio data read out from the main memory 13 are synthesized by the digital interface processing circuit 24 and output from the digital output terminal 25. Therefore, the data can be connected to other digital equipments.

(C) Reverse Reproducing Operation

When an instruction for a reverse reproducing operation is sent from the operation key 14, the system controller 11 reads out only the ID of audio data from the main memory 13 in an opposite direction, thereby searching a silent portion and confirming the contents. Upon detection of an ID representing the first silent portion, the system controller 11 designates the memory controller 12 to read out audio data and video data synchronized with the audio data in units of fields up to an address of the start of search in the forward direction from an address at which the ID is stored.

The data read operation is controlled by the memory controller 12 as follows. An ID representing a silent portion is detected. A block from the address at which the ID is stored to an address at which the ID representing the silent portion has been detected is defined as a unit. Data in this unit is read out in the forward direction, i.e., in the same order as in recording while the address is repeated in the opposite direction every unit.

An example of the reverse reproducing operation will be described below with reference to FIGS. 2A, 3A and 3B.

FIG. 3A is a view showing a state wherein a video signal is stored in the main memory 13. FIG. 3B is a view showing a state wherein an audio signal is stored in the main memory 13. The video and audio signals are recorded in an order of units $\alpha$, $\beta$, and $\gamma$ in a time base direction from left to right in FIG. 2A and from the lower side to the upper side in FIG. 3B.

The memory controller 12 reads out audio data in the unit $\gamma$ and video data synchronized with this audio data (4th field from the 1st field) in the forward direction (in the time base direction). The address is shifted to the start address of the unit $\beta$, and data is read out (Z1 and Z2 in FIGS. 3A and 3B), and subsequently the unit $\alpha$ is read out. This operation is repeated. That is, the data is read out in the same direction as in recording, i.e., in the time base direction inside a block while the overall data is read out in a direction opposite to the time base direction. Therefore, recorded audio data can be confirmed while the data is apparently reproduced so as to precede along the time base.

The readout data is processed as in the normal reproducing operation and output to the video monitor 23 and the sound monitor 22.

The present invention is not limited to the above embodiment, and various changes and modifications can also be made. Modifications will be described below.

(1) In the above embodiment, the reverse reproducing operation has a speed equal to that of the forward reproducing operation. However, for the conventional VTR, a high-speed reverse reproducing operation is present. When the high-speed reverse reproducing operation is to be performed in the information recording and reproducing apparatus using the memory of the above embodiment, video and audio data in the unit γ are reproduced first in the forward direction in FIGS. 3A and 3B. Thereafter, the next block is skipped to shift the address to the unit α, thereby changing the address and reproducing the data. Similarly, the high-speed reproducing operation in the forward direction, or a fast forward reproducing operation can also be performed by skipping the block in the forward direction to change the address.

(2) In the above embodiment, audio and video data are synchronized with each other and reproduced. However, in a special reproducing operation, audio and video data need not always be synchronized with each other. More specifically, video data can be monitored without any sense of incompatibility by a reverse reproducing operation in units of fields. For this reason, for a video signal, the address is changed in units of fields in FIG. 3A, as in the above embodiment. An audio signal is reproduced while updating the address in units of silent portions such that the contents can be understood. A high-speed reverse reproducing operation or a fast forward operation can also be performed by skipping the unit as in the modification (1).

(3) In the above embodiment and the modifications (1) and (2), audio data is reproduced in units of silent portions. However, a portion without audio data does not necessarily become a silent portion. Taking this case into consideration, an audio extraction circuit 41 such as a bandpass filter for extracting audio data may be connected to the input of the level detection circuit 31 in the silent portion detection circuit, as shown in FIG. 4.

(4) Instead of reproducing audio data in units of silent portions, the user can write an ID with the operation key 14 or a switch during recording. With this operation, audio data can be reproduced in predetermined units for free special reproduction.

What is claimed is:

1. A data recording and reproducing apparatus comprising:
    (a) audio dividing means for dividing input audio data into a plurality of portions;
    (b) recording means for continuously recording input image data and the audio data divided by said audio dividing means in a solid-state memory;
    (c) audio reproducing means for reproducing the audio data from said solid-state memory in units of said portions, said audio reproducing means reproducing the audio data while changing a reproducing start address of each portion of the audio data in an order different from that in recording; and
    (d) image reproducing means for reproducing the image data from said solid-state memory, said image reproducing means dividing the image data recorded in said solid-state memory into a plurality of portions according to said plurality of portions of the audio data to reproduce the image data in units of said portions, and reproducing the image data while changing the reproducing start address of each portion of the image data in an order different from that in recording.

2. An apparatus according to claim 1, wherein said audio reproducing means reproduces the audio data while changing the reproducing start address of each portion of the audio data in a direction opposite to that in recording, and said image reproducing means reproduces the image data while changing the reproducing start address of each portion of the image data in a direction opposite to that in recording.

3. An apparatus according to claim 1, wherein said audio dividing means divides the audio data into said plurality of portions in accordance with a level of the input audio data.

4. An apparatus according to claim 1, further comprising audio ID generating means for generating audio ID data representing each portion of the audio data divided into said plurality of portions, and wherein said recording means records the audio ID data in said solid-state memory in units of said plurality of portions of the audio data.

5. An apparatus according to claim 4, wherein said reproducing means changes the reproducing start address of each portion of the audio data on the basis of the audio ID data reproduced from said solid-state memory device.

6. An apparatus according to claim 1, wherein said audio reproducing means reproduces a predetermined number of portions of the audio data one by one, and said image reproducing means reproduces the predetermined number of portions of the image data one by one.

7. An apparatus for reproducing audio data and image data from a solid-state memory in which the audio data and the image data, each of which is divided into a plurality of portions, are recorded, comprising:
    (a) reproducing means for reproducing the audio data and the image data from said solid-state memory in units of said portions; and
    (b) control means for controlling said reproducing means to reproduce the image data and the audio data while changing a reproducing start address of each portion of the image data and the audio data in an order different from that in recording.

8. An apparatus according to claim 7, wherein said control means changes the reproducing start address of each portion of the image data and the audio data in a direction opposite to that in recording.

9. An apparatus according to claim 8, wherein said reproducing means reproduces a predetermined number of portions of the audio data one by one and reproduces the predetermined number of the image data one by one.

10. An apparatus according to claim 7, wherein said control means changes the reproducing start address of each portion of the image data and the audio data in the same direction as in recording, and
    said reproducing means reproduces a predetermined number of portions of the audio data one by one and reproduces a predetermined number of portions of the image data one by one.

11. An apparatus according to claim 7, wherein the image data is divided into a plurality of portions in units of frames and recorded, and said reproducing means changes the reproducing start address of the image data in units of frames.

12. Apparatus according to claim 7, further comprising reproducing means for reading out the image data and the audio data from the solid-state memory device.

13. Apparatus according to claim 12, further comprising image monitoring means for monitoring the reproduced image signal.

14. Apparatus according to claim 12, further comprising audio monitoring means for monitoring the reproduce audio signal.

15. Apparatus according to claim 12, further comprising image output means for outputting the reproduced image signal to an image monitoring device.

16. Apparatus according to claim 23, further comprising audio output means for outputting the reproduced audio signal to an audio monitoring device.

17. Apparatus according to claim 7, wherein the solid-state memory device comprises a memory having an exchangeable form.

18. Apparatus according to claim 7, wherein the solid-state memory device comprises an IC card.

19. Apparatus according to claim 7, wherein the image data comprises data whose data amount is compressed and which is encoded.

20. Apparatus according to claim 19, further comprising expansion means for decoding the image data reproduced by said reproducing means and expanding the code amount of the reproduced image data.

21. Apparatus according to claim 7, wherein said reproducing means reproduces the audio data and the image data corresponding to said audio data.

22. Apparatus according to claim 7, wherein said reproducing means reproduces additional data representing each portion of the audio data, from said solid-state memory, and wherein said control means controls said reproducing means by using said addition data.

* * * * *

UNITED STATES PATENT AND TRADEMARK OFFICE
CERTIFICATE OF CORRECTION

PATENT NO. : 5,774,192
DATED : June 30, 1998
INVENTOR(S) : SHINICHI KOYAMA

It is certified that error appears in the above-indentified patent and that said Letters Patent is hereby corrected as shown below:

Column 4

Line 23, "synchronizes" should read --synchronize--;
    Line 53, "3A and 3B" should read --3--;
    Line 54, "FIG. 3A" should read --3--;
    Line 55, "FIG. 3B" should read --3--;
    Line 60, "3B" should read --3--; and
    Line 65, "FIGS. 3A and 3B)," should read --FIG. 3),--.

Column 5

Figure 3:
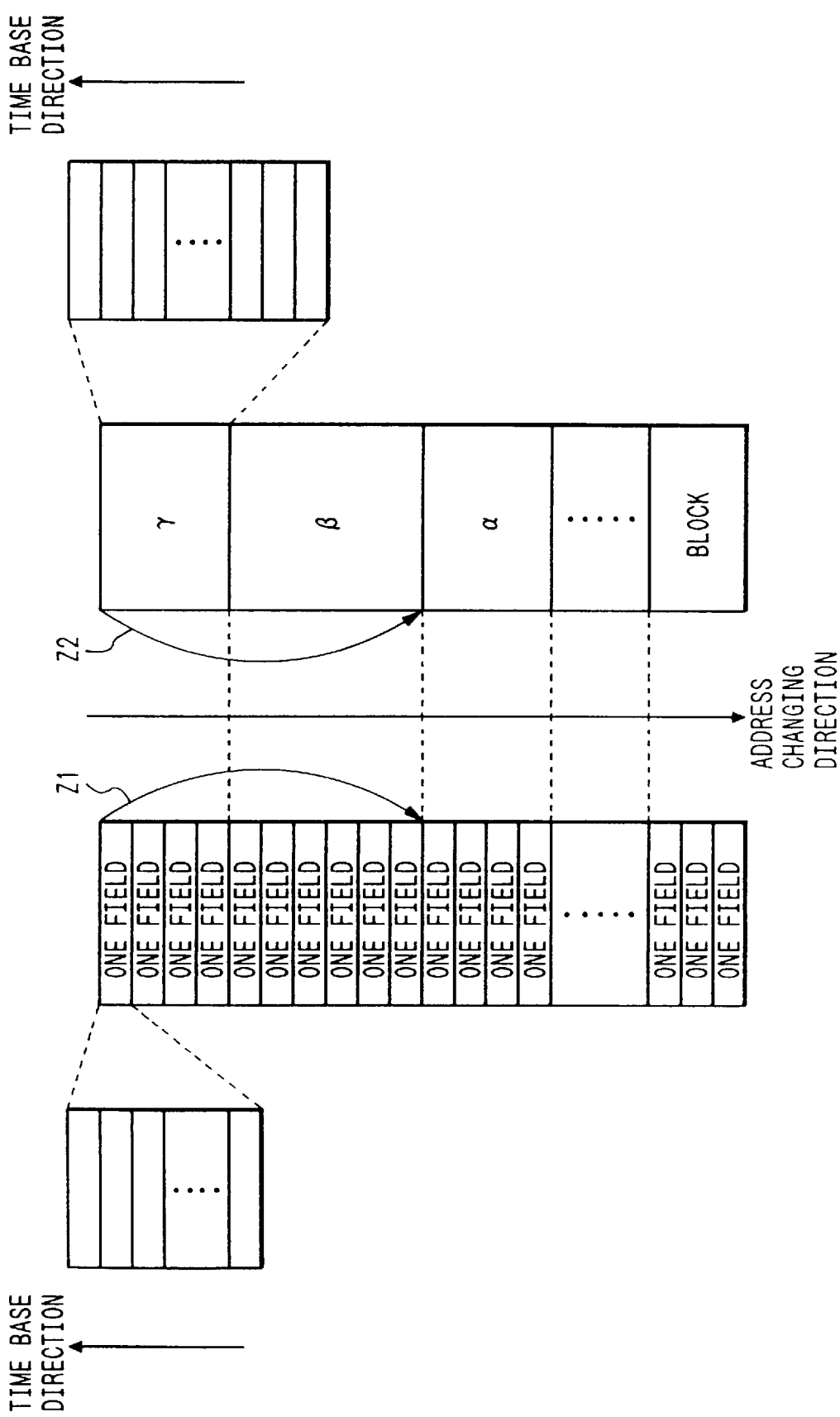
FIG. 3 is a view showing a data form of a main memory in FIG. 1.

Line 19, "FIGS. 3A and 3B." should read --FIG. 3.--.

UNITED STATES PATENT AND TRADEMARK OFFICE
CERTIFICATE OF CORRECTION

PATENT NO. : 5,774,192
DATED : June 30, 1998
INVENTOR(S) : SHINICHI KOYAMA

It is certified that error appears in the above-indentified patent and that said Letters Patent is hereby corrected as shown below:

Column 7:

Line 1, "claim 12," should read --claim 7,--;
Line 2, "monitoring" (second occurrence) should read --monitoring images represented by--;
Line 3, "signal" should read --data.--;
Line 4, "claim 12," should read --claim 7,--;
Line 5, "reproduce" should read --reproduced--;
Line 6, "signal" should read --data.--;
Line 7, "claim 12," should read --claim 7,--;
Line 9, "signal" should read --data.--;
Line 10, "claim 23," should read --claim 7,--;
Line 12, "signal" should read --data--;
Line 14, "memory device" should read --memory--; and
Line 17, "memory device" should read --memory--.

Signed and Sealed this

Ninth Day of March, 1999

Attest:

Q. TODD DICKINSON

*Attesting Officer*   *Acting Commissioner of Patents and Trademarks*